(12) United States Patent
Diaz et al.

(10) Patent No.: US 10,015,099 B2
(45) Date of Patent: *Jul. 3, 2018

(54) SYSTEMS AND METHODS FOR IP SHARING ACROSS WIDE AREA NETWORKS

(71) Applicants: Manuel Diaz, Miami, FL (US); Chris Kurzweg, Miami, FL (US); Jonathan Ham, Miami, FL (US)

(72) Inventors: Manuel Diaz, Miami, FL (US); Chris Kurzweg, Miami, FL (US); Jonathan Ham, Miami, FL (US)

(73) Assignee: THE VIKI GROUP, INC., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/137,831

(22) Filed: Apr. 25, 2016

(65) Prior Publication Data

US 2016/0241476 A1  Aug. 18, 2016

Related U.S. Application Data

(63) Continuation of application No. 14/294,650, filed on Jun. 3, 2014, now Pat. No. 9,350,668.

(51) Int. Cl.
| | |
|---|---|
| *H04L 12/803* | (2013.01) |
| *H04L 12/749* | (2013.01) |
| *H04L 29/12* | (2006.01) |
| *H04L 12/723* | (2013.01) |

(52) U.S. Cl.
CPC ............ *H04L 47/125* (2013.01); *H04L 45/50* (2013.01); *H04L 45/741* (2013.01); *H04L 61/2084* (2013.01); *H04L 61/2514* (2013.01)

(58) Field of Classification Search
CPC ... H04L 47/125; H04L 45/50; H04L 61/2514; H04L 61/2084; H04L 45/741
See application file for complete search history.

(56) References Cited

U.S. PATENT DOCUMENTS

| | | |
|---|---|---|
| 8,949,459 B1 | 2/2015 | Scholl |
| 2013/0263256 A1 | 10/2013 | Dickinson et al. |
| 2014/0036663 A1 | 2/2014 | Narayanan |
| 2015/0350155 A1 | 12/2015 | Diaz et al. |

OTHER PUBLICATIONS

"PCT Notification of Transmittal of the International Search Report and the Written Opinion" International Searching Authority, dated Dec. 27, 2016, for International Application No. PCT/US2016/053736, 9pgs.

*Primary Examiner* — Phuc Tran
(74) *Attorney, Agent, or Firm* — Buckley, Maschoff & Talwalkar LLC

(57) ABSTRACT

Computer connectivity is dependent on network availability. When networks are offline, relocating systems and data to an available network is an inefficient, time consuming, and error prone process. A system and method is disclosed for instant IP sharing and relocation between geographical locations by combining BGP announcement in one or multiple locations and applying stateless NAT to the IP traffic. Thereby, IP traffic is redirected to the desired location and delivered to the final device using the shared/relocated IP address. This system and method allows a single IP address to actively respond to network requests to from numerous locations which can be spread around the globe.

20 Claims, 4 Drawing Sheets

SYSTEMS AND METHODS FOR IP SHARING ACROSS WIDE AREA NETWORKS

CROSS-REFERENCE TO RELATED APPLICATION

The present application is a continuation of U.S. patent application Ser. No. 14/294,650 entitled "SYSTEMS AND METHODS FOR IP SHARING ACROSS WIDE AREA NETWORKS" and filed Jun. 3, 2014. The entire content of that application is incorporated herein by reference.

FIELD OF THE INVENTION

This invention relates to systems and methods associated with IP ("Internet Protocol") address mobility and management. Some embodiments allow for the automatic live migration of virtual machines, whole server functions or applications running on a server across geographically distant locations without a change in IP address and with no human intervention whatsoever at the time of migration. Embodiments may also support the relocation of services across cities/states/countries with near zero detectable loss of network connection to the server, and zero detectable interruption of service to an end user. Despite many years of research and work by experts in this area, IP address sharing and mobility without BGP modifications at the time of IP relocation, or IP tunnels or VPN is an unsolved problem that can only be done manually. Even when configured optimally, changes to BGP causes convergence delays. Also, VPN and IP tunnels have single points of failure making them undesirable for high bandwidth applications or truly redundant network architecture.

BACKGROUND

Moving IP addresses across geographically distant locations represents a challenge for today's Internet. There is no easy way to share and relocate an IP address from one datacenter to another one quickly. The process requires route propagation and convergence delay of DNS. BGP and other Internet infrastructure cause delays and overhead making them impractical for production environments such Virtual Private Networks ("VPN") or for specific applications such as virtual machine live migration. As a result, while server and network redundancy may exist within a single datacenter, current methods to accomplish automatic failover of servers and applications are not efficient and introduce undesirable characteristics to the infrastructure.

For example, an online retailer might utilize a datacenter which may refer to any facility that houses computer systems and associated components, such as servers, virtual machines, telecommunications, and storage systems. Moreover, to provide continued operation in the face of outages (e.g., in the event of a natural disaster), some businesses are able to utilize multiple datacenters in different geographic locations. In this way, when one datacenter fails for some reason, replicated services can be brought online in another datacenter to begin supporting the business. Typically, this involves an Information Technology ("IT") specialist who is able to activate and configure the network services in the new datacenter as appropriate. Such an approach, however, is a time consuming and error prone process that even if executed flawlessly is still subject to delays in routing table convergence across the Globe. Frequently, the events which call for an IT specialist to move networks is the result of an outage in mission critical services to an organization that has the specialist in an extremely high stress environment, possibly in the middle of the night or while they are in a remote location which makes access to the systems they need to correction impossible. Further, it is common for a network administrator to have to contact a third party upstream provider such as Level 3, AT&T, or IBM to have them make changes. This can result in hours or days of downtime. Some embodiments described herein allow the network administrator to have the network pre-configured in such a way that no network reconfiguration is required at any level to redirect services.

Moreover, in the traditional IP computing environment, the resources allocated to a service include the IP address that is usually bound to a specific physical location. As a result, it can be difficult to relocate the service quickly to another geographical location without a manual IP reconfiguration which in most cases is a difficult scenario because of the time and labor required for Domain Name System ("DNS") changes/updates, Operating System ("OS") reconfigurations, and/or external scripts that may be associated with the service current IP address. This invention allows you to use the same IP address in multiple locations in a way that it is configured for automatic traffic redirection and distribution.

Accordingly, methods and mechanisms to efficiently, accurately, and/or automatically facilitate IP relocation across geographically distance locations instantly, will be provided in accordance with some embodiments described herein.

SUMMARY

Some embodiments provide a system or method, to facilitate instant IP relocation across geographical locations, facilitating applications that require geographical IP mobility, some of which include Virtual Machine ("VM") over Wide Area Network ("WAN") migration, high availability, disaster recovery, load balancing and others.

With these as well as other advantages and features that will become hereinafter apparent, further information may be obtained by reference to the following detailed description and appended claims, and to the figures attached hereto.

DETAILED DESCRIPTION

As used herein, the term "datacenters" may refer to, for example, facilities that house computer systems and associated components, such as telecommunications and storage systems.

As used herein, the term "Global Network IP subnet" will refer to the IP address subnet that will have the ability to relocate instantly from one geographical location to another one.

As used herein, the term "Global IP" will refer to an individual IP address belonging to the Global Network IP subnet.

Figure 1:
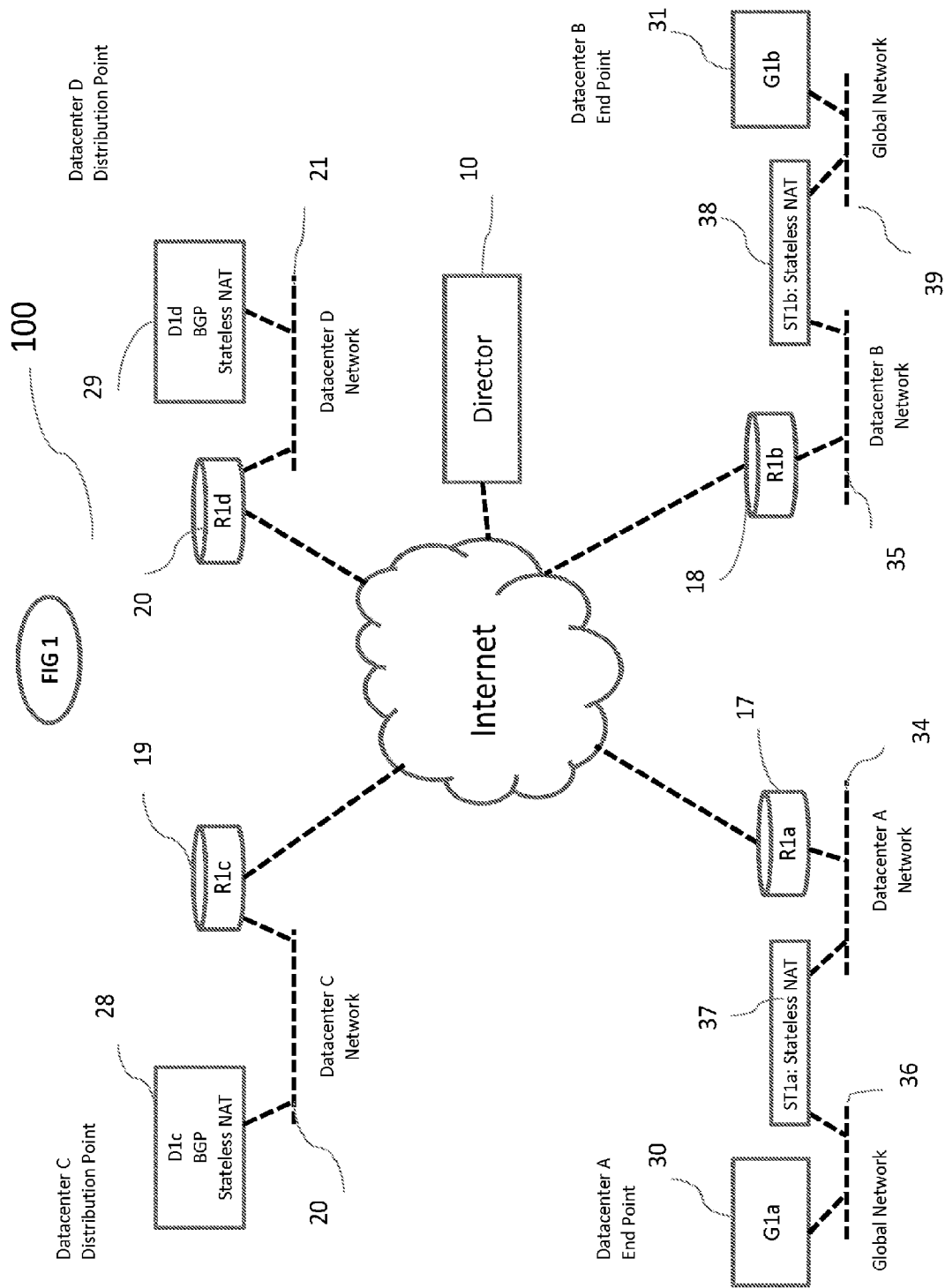
FIG. 1 is a block diagram of system architecture according to some embodiments.

FIG. 1 is a block diagram of a system 100 according to some embodiments. The system 100 spans across four locations (Datacenter A through D) for the purposes of this explanation, but may include more than four datacenters. Note that the four locations may communicate with each other through the Internet without a dedicated link.

According to some embodiments, device 28 (D1c) is connected to Datacenter C network 20 and will advertise the Global Network IP subnet through Border Gateway Protocol ("BGP") to the internet, this location will be called a distribution point, IP traffic arriving at this distribution point for the Global Network IP subnet will be subject to stateless Network Address Translation ("NAT") and redirected to a Datacenter A network local IP address, a Datacenter B network local IP address or both. Note that Datacenter C network 20 may communicate over the Internet via a router 19 (R1c).

Similarly, the device 29 connected to Datacenter D Network 21 may also, according to some embodiments, advertise the Global Network IP subnet through BGP. Incoming traffic for the Global Network IP subnet will be subject to stateless NAT and redirected to a Datacenter A network local IP address, Datacenter B network local IP address or both. Note that Datacenter D 21 may communicate over the Internet via a router 20 (R1d).

Please note that it is possible to have only one distribution point with no redundancy or more distribution points scattered throughout the internet in different geographical locations all advertising the Global Network IP subnet Both devices (D1c, 28) and (D1d, 29) may be in active/active configuration advertising the Global Network IP subnet through BGP with the same or different AS numbers.

According to some embodiments, a device 37 (ST1a) is connected to datacenter A network 34 and will receive the traffic sent by the distribution points (Datacenter C and Datacenter D) destined to network A local subnet 34. This IP traffic will be subject to stateless NAT and destination IP will be translated back to the Global Network IP subnet, move to the Global Network 36 and delivered to the device 30 (G1a) using a Global IP Address to provide a service. Response from device 30 (G1a) will be sent directly to the initiator of the IP connection without any modification; this location will be called an end point. Note that the device 37 (ST1a) may communicate over the Internet via a router 17.

Note that some embodiments may only introduce delay in one direction and, because in most client-server interactions the majority of the traffic flow from the server to the client, the system's impact is minimized.

Similarly, a device 38 (ST1b) is connected to datacenter B network 35 will receive the traffic sent by the distribution points (Datacenter C and Datacenter D) destined to network B local subnet 35, this IP traffic will be subject to stateless NAT and destination IP will be translated back to the Global Network IP subnet, moved to the Global Network 39 and delivered to the device 31 (G1b) using the global IP address to provide a service, this location will also be called an end point. Note that the device 38 (ST1b) may communicate over the Internet via a router 18.

Please note that to be able to redirect the IP traffic destined to the Global Network IP subnet from the distribution points to the end points, the destination IP address of that traffic will be replaced with IP addresses belonging to the local network of the datacenter of the selected end point. When the traffic arrives at the network of the datacenter selected as the end point the destination IP of that traffic will be reverted back to its original form with the destination IP in the Global Network IP subnet and delivered to the intended device using the global IP. The device using the global IP can communicate the response directly to the remote end of the IP connection without modification, thus closing the communication loop. It is important to note that stateless NAT is required, as the devices doing the destination IP swaps will only see half of the connections. Specifically the traffic destined for the Global Network IP subnet will not receive the response to the IP traffic.

A scenario when the packages from the device using the global IP flow the same path in reverse order of the incoming packages using stateful NAT may be possible but suboptimal.

Referring again to FIG. 1, the stateless NAT rules in devices 28, 29, 37 and 38 can be synchronized by a management entity or a server director 10 that will have information about: (1) the assignment of IP within Global Network IP subnet, (2) the local networks 34 and 35 in the end points, (3) the correlation between these 3 networks and traffic policies that will dictate when or how the traffic should flow from the distribution to the end points.

Please note for correlation between IP addresses within the Global Network IP subnet and end point local IP addresses could take many forms. For example, many global IP addresses can be redirected to the same end point local IP address but we could imagine that one to be the most common scenario, in a 1 to 1 scenario you will need 1 local IP in each end point that is expected to received traffic for every assigned IP in the Global Network IP subnet.

Please note that if you don't directly control the networks in the distribution and end points you will need to ask the entity in control to allow traffic with source IP addresses not belonging to the local network, to exit their network. Some administrators block this traffic to avoid IP spoofing from their network. Specifically, the distribution points will appear as a transient network. This transient passes Global IP traffic for all incoming traffic subnets to the end points. At the end points only the Global Network IP subnet could be allowed to exit the network (outbound access).

Note that FIG. 1 represents a logical architecture for the system 100 according to some embodiments, and actual implementations may include more or different components arranged in other manners. Moreover, each system described herein may be implemented by any number of devices in communication via any number of other public and/or private networks. Two or more of devices may be located remote from one another and may communicate with one another via any known manner of network(s) and/or a dedicated connection. Further, each device may comprise any number of hardware and/or software elements suitable to provide the functions described herein as well as any other functions. Other topologies may be used in conjunction with other embodiments.

Any of the devices illustrated in FIG. 1, may exchange information via any communication network which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

All systems and processes discussed herein may be embodied in program code stored on one or more computer-readable media. Such media may include, for example, a floppy disk, a CD-ROM, a DVD-ROM, magnetic tape, OR solid state Random Access Memory (RAM) or Read Only Memory (ROM) storage units. Embodiments are therefore not limited to any specific combination of hardware and software.

Figure 2:
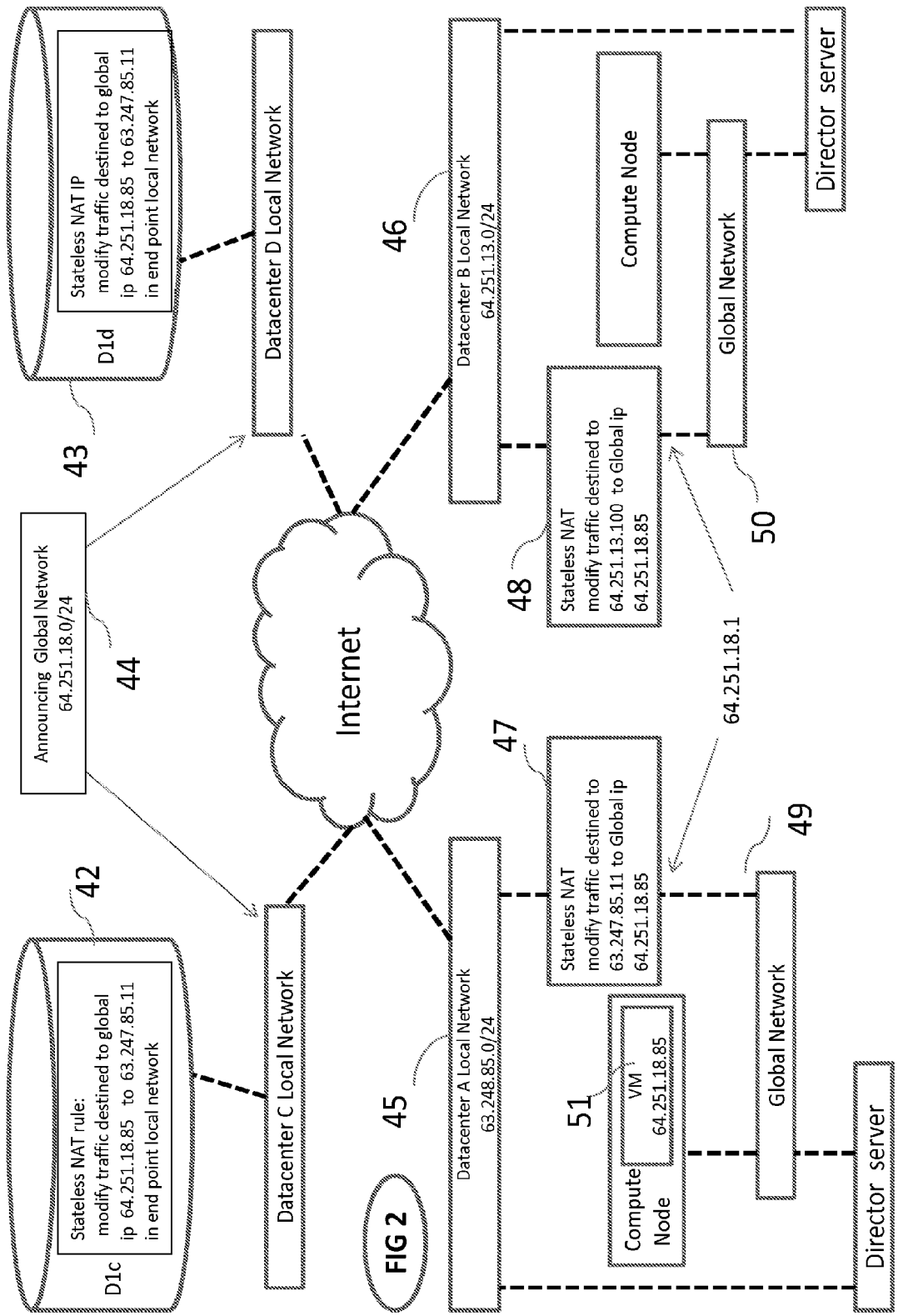
FIG. 2 is an example in accordance with some embodiments.

FIG. 2 is an example of a system with no single point of failure implementing the technology to achieve automatic virtual machine WAN live migration. In this example IPv4 subnets were used for ease of demonstration (IPv6 could be implemented as well). In this example, stateless NAT distribution devices 42 and 43 in Datacenters C and D are advertising network 64.251.18.0/24 the Global Network IP subnet 44 through BGP in a master/master configuration to the Internet. When an IP address package that is destined for the global IP address 64.251.18.85 assigned to Virtual Machine (VM) 51 arrives the Stateless NAT devices 42 and 43 in the distribution point translate the destination IP address of the IP package from 64.251.18.85 (the global IP address) to an IP address in the local network of the end point where VM 51 is currently running: Datacenter A (networks 45 in this case). When the IP package arrives to the Datacenter A network, stateless NAT device 47 translates the destination IP of the IP package from the Datacenter A IP address 63.247.85.11 to the global IP 64.251.18.85, and delivers the IP package to global network 49 and to VM 51. VM 51 replies directly to the initiator of the connection via client global network 49 and the Stateless NAT device 47 should not need to modify the outgoing IP traffic in any way. Note that FIG. 2 further includes a datacenter B local network 46, a datacenter B stateless NAT device 48, and a global network 50.

Figure 3:
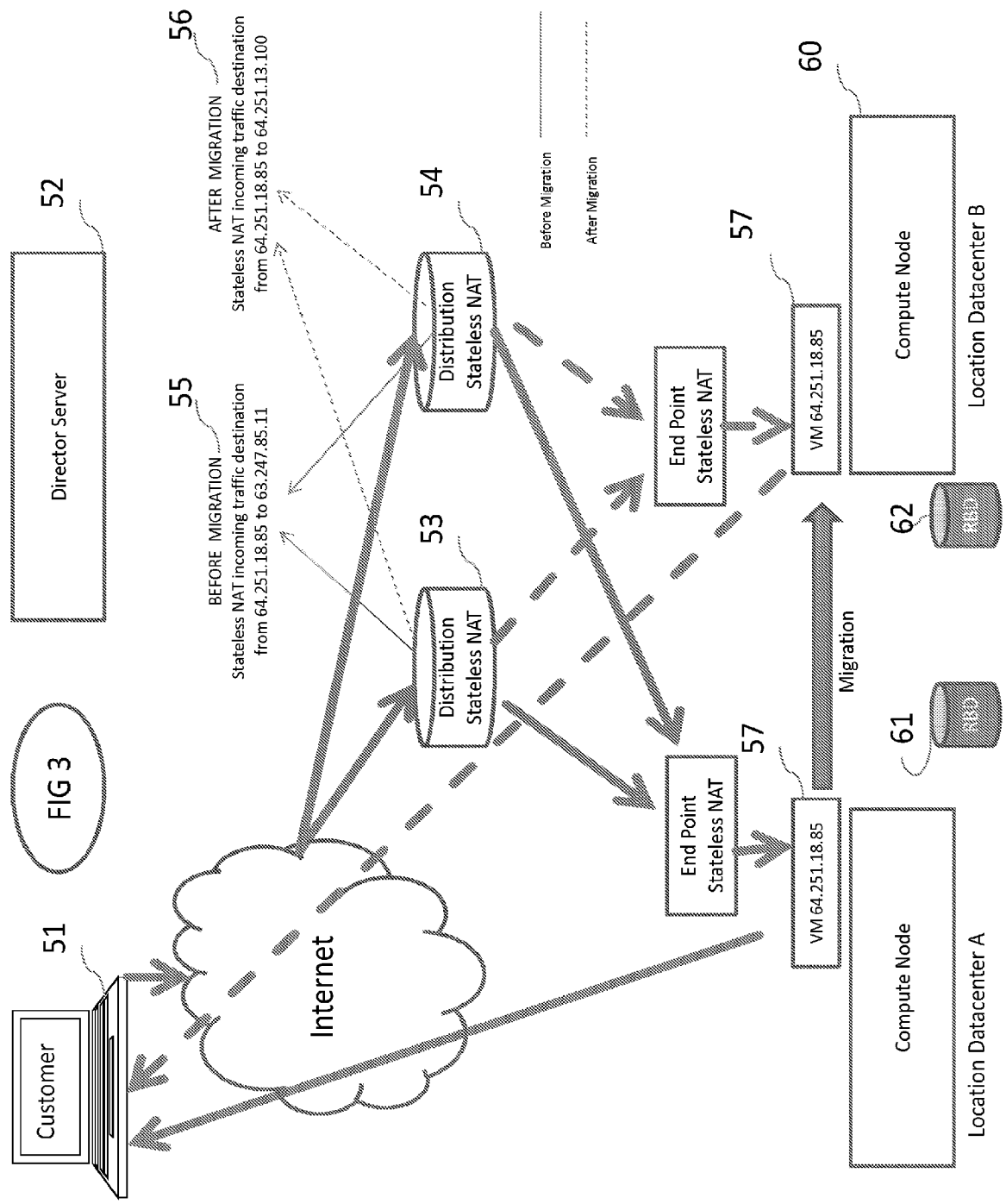
FIG. 3 is a traffic flow diagram according to some embodiments.

FIG. 3 illustrates IP traffic flow both when a customer 51 is communicating with VM 57 (running in Datacenter A) during a live migration. The solid lines show the initial communication flow. In particular, the IP traffic leaves Customer 51 and travels through the Internet to arrive at the states NAT distribution point devices 53 and 54. Devices 53 and 54, using the pre-migration 55 Stateless NAT rules, redirect the traffic to Datacenter A where VM 57 is running. During live migration, device 52 will verify that the destination compute node 60 is prepared to run VM 57 and that the storage devices RBD 61 and 62 are synchronized. Device 52 will then initiate the migration and, upon a successful migration, modify the stateless NAT rules in distribution devices 53 and 54 (to "post-migration" rules 56) to redirect the traffic from Datacenter A to Datacenter B instantly.

Device 52, using the ZIP codes of the four datacenter locations, could check different sources for severe alerts, including: available weather APIs for severe weather alerts, Earthquake Hazards Program (seismic activity) data, etc. to schedule a migration accordingly. Device 52 could also react to unpredictable events and start the VM in an available end point if one becomes unreachable for any reason. Device could also provide an WEB/CLI interface to schedule or perform migration.

This dispersed system spans across four datacenters with no single point of failure, two datacenters running cloud infrastructure and providing resources to run multiple VMs, and the other two redirecting the Internet Protocol traffic to the datacenters where the VMs are running (distribution points). The distribution point devices must be capable of doing stateless NAT and perform BGP announcement, these functions can be performed by one device or a combination of devices. By way of example, the devices doing the BGP announcement might be CISCO or JUNIPER routers, or a LINUX server running software such as QUAGGA and the devices doing the stateless NAT in the distribution and end points could be a Linux server or embedded device running IP tables with Xtables-addons modifying the PRE-ROUTING chain inside the RAWDNAT table to create the stateless NAT rules. Any other device or software that provide similar functionalities can also be used.

Because these devices see all the traffic that arrives to the VM, it may be also suitable to place an Intrusion Detection System ("IDS") to protect the Global network IP subnet if desired.

("DRBD") and DRBD proxy could be used in this example to support storage WAN replication for the VM migration. Note that a DRBD proxy may be deployed in a variety of high-latency, low-bandwidth environments but other technologies might also be used to implement the storage WAN replication Because a layer 2 split does exist in the Global network IP subnet, VMs can form groups of one VM or more that device 52 may treat as if they form a unity (and must run in the same datacenter or end point). For example, a VM serving as a database server and a VM serving as a webserver may form a group that must run at the same end point. If one of the VMs needs to be migrated to an alternate end point, the other VMs in the group should be migrated as well.

Figure 4:
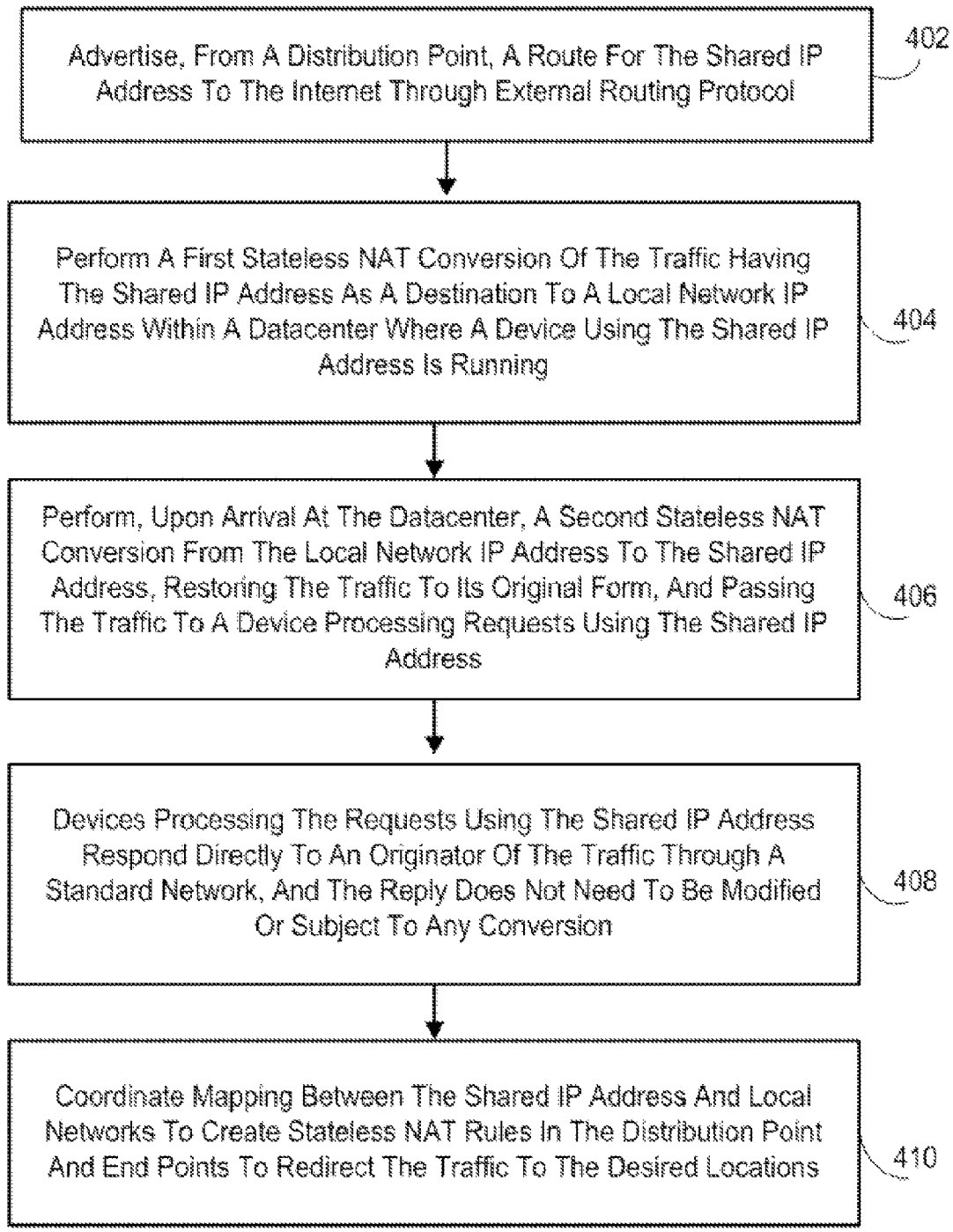
FIG. 4 illustrates a method in accordance with some embodiments.

FIG. 4 illustrates a method in accordance with some embodiments. The method may be associated with, for example, sharing an IP address (e.g., an IPv4 address or IPv6 address) between geographically distant locations and redirecting IP traffic instantly to desired locations in a system. Note that the method of FIG. 4 might be associated with, for example, a failover process, virtual machine migration, and/or load balancing. At 402, a distribution point may advertise a route for the shared IP address to the Internet through external routing protocol (e.g., BGP). Note that more than one distribution point might be associated with any of the embodiments described herein.

At 404, the distribution point may perform a first stateless NAT conversion of the traffic having the shared IP address as a destination to a local network IP address within a datacenter where a device using the shared IP address is running. At 406, upon arrival at the datacenter, a second stateless NAT conversion may be performed from the local network IP address to the shared IP address, restoring the traffic to its original form, and passing the traffic to a device processing requests using the shared IP address, At 408, the devices processing the requests using the shared IP address respond directly to an originator of the traffic through a standard network (e.g., a to Multi-Protocol Label Switching ("MPLS") network or public Internet links), and the reply does not need to be modified or subject to any conversion. At 410, mapping between the shared IP address and local networks may be coordinated to create stateless NAT rules in the distribution point and end points to redirect the traffic to the desired locations. Note that 410 might be performed, for example, by a director server or management entity.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A method for sharing an Internet Protocol ("IP") address between geographically distant locations and redirecting IP traffic to desired locations in a system, comprising:

advertising, from a distribution point, a route for the shared IP address to the Internet through an external routing protocol;

performing, by the distribution point, a first stateless Network Address Translation ("NAT") conversion of traffic having the shared IP address as a destination to a local network IP address where a device using the shared IP address is running;

performing a second stateless NAT conversion from the local network IP address to the shared IP address, restoring the traffic to its original form, and passing the traffic to a device processing requests using the shared IP address for the traffic, wherein the device processing the requests using the shared IP address responds to an originator of the traffic through a standard network, and the reply is not modified; and coordinating mapping between the shared IP address and local networks to create stateless NAT rules in the distribution point and end points to redirect the traffic to the desired locations.

2. The method of claim 1, wherein the external routing protocol is Border Gateway Protocol ("BGP").

3. The method of claim 1, wherein the standard network is associated with a Multi-Protocol Label Switching ("MPLS") network or public Internet links.

4. The method of claim 1, wherein the IP address is an IP version 4 ("IPv4") address or an IPv6 address.

5. The method of claim 1, wherein said coordinating is performed by at least one of a director server or management entity.

6. The method of claim 1, wherein the method is performed in connection with at least one of: (i) a failover process, (ii) virtual machine migration, and (iii) load balancing.

7. The method of claim 1, wherein multiple distribution points are provided.

8. A system for sharing an Internet Protocol ("IP") address between geographically distant locations and redirecting IP traffic to desired locations in a system, comprising:

a distribution point to (i) advertise a route for the shared IP address to the Internet through an external routing protocol, and (ii) perform a first stateless Network Address Translation ("NAT") conversion of traffic having the shared IP address as a destination to a local network IP address where a device using the shared IP address is running, wherein a second stateless NAT conversion is to be performed from the local network IP address to the shared IP address, restoring the traffic to its original form, and passing the traffic to a device processing requests using the shared IP address for the traffic, and further wherein the device processing the requests using the shared IP address responds to an originator of the traffic through a standard network, and the reply is not modified; and a director server or management entity to coordinate mapping between the shared IP address and local networks to create stateless NAT rules in the distribution point and end points to redirect the traffic to the desired locations.

9. The system of claim 8, wherein the external routing protocol is Border Gateway Protocol ("BGP").

10. The system of claim 8, wherein the standard network is associated with a Multi-Protocol Label Switching ("MPLS") network or public Internet links.

11. The system of claim 8, wherein the IP address is an IP version 4 ("IPv4") address or an IPv6 address.

12. The system of claim 8, wherein the system is associated with at least one of: (i) a failover process, (ii) virtual machine migration, and (iii) load balancing.

13. The system of claim 8, wherein multiple distribution points are provided.

14. A non-transitory, computer-readable medium storing instructions that, when executed by computer processors, cause the computer processors to perform a method for sharing an Internet Protocol ("IP") address between geographically distant locations and redirecting IP traffic to desired locations in a system, the method comprising:

advertising, from a distribution point, a route for the shared IP address to the Internet through an external routing protocol;

performing, by the distribution point, a first stateless Network Address Translation ("NAT") conversion of traffic having the shared IP address as a destination to a local network IP address where a device using the shared IP address is running;

performing a second stateless NAT conversion from the local network IP address to the shared IP address, restoring the traffic to its original form, and passing the traffic to a device processing requests using the shared IP address for the traffic, wherein the device processing the requests using the shared IP address responds to an originator of the traffic through a standard network, and the reply is not modified; and coordinating mapping between the shared IP address and local networks to create stateless NAT rules in the distribution point and end points to redirect the traffic to the desired locations.

15. The medium of claim 14, wherein the external routing protocol is Border Gateway Protocol ("BGP").

16. The medium of claim 14, wherein the standard network is associated with a Multi-Protocol Label Switching ("MPLS") network or public Internet links.

17. The medium of claim 14, wherein the IP address is an IP version 4 ("IPv4") address or an IPv6 address.

18. The medium of claim 14, wherein said coordinating is performed by at least one of a director server or management entity.

19. The medium of claim 14, wherein the method is performed in connection with at least one of: (i) a failover process, (ii) virtual machine migration, and (iii) load balancing.

20. The medium of claim 14, wherein multiple distribution points are provided.

* * * * *